Aug. 18, 1936.  E. V. POWELL  2,051,176
WIND INSTRUMENT OF THE REED TYPE
Filed Sept. 29, 1934  7 Sheets—Sheet 1

Inventor:
Edward V. Powell,

Aug. 18, 1936.                E. V. POWELL                 2,051,176
                   WIND INSTRUMENT OF THE REED TYPE
                      Filed Sept. 29, 1934           7 Sheets-Sheet 2

Inventor:
Edward V. Powell,
Att'ys

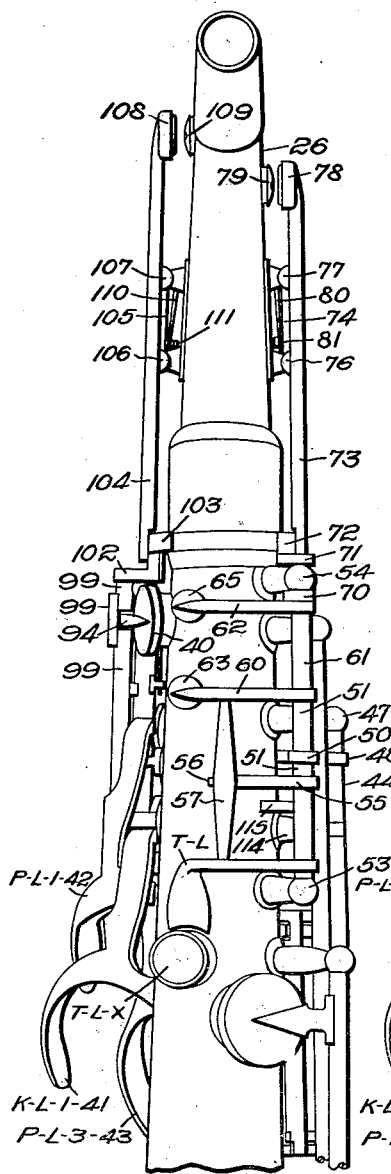
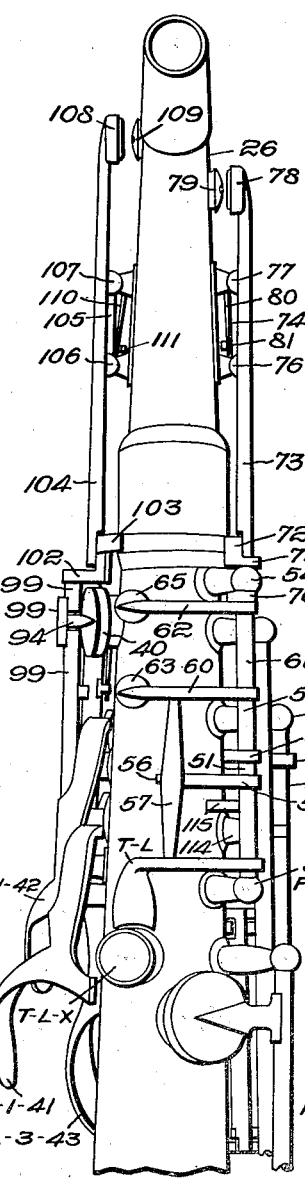
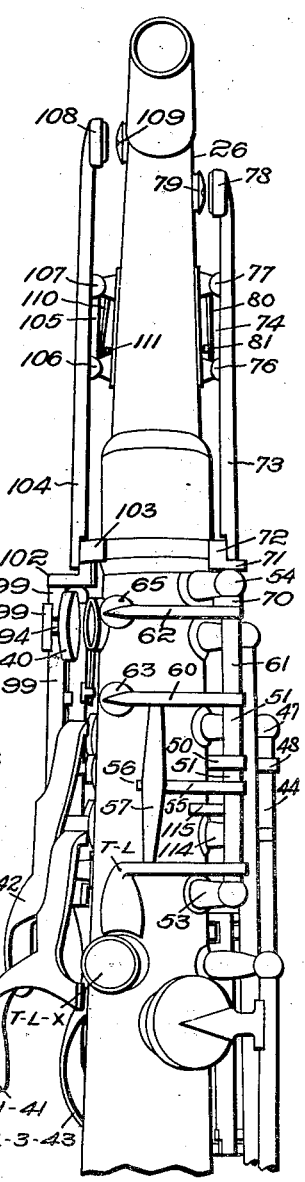

Aug. 18, 1936.   E. V. POWELL   2,051,176
WIND INSTRUMENT OF THE REED TYPE
Filed Sept. 29, 1934   7 Sheets-Sheet 4
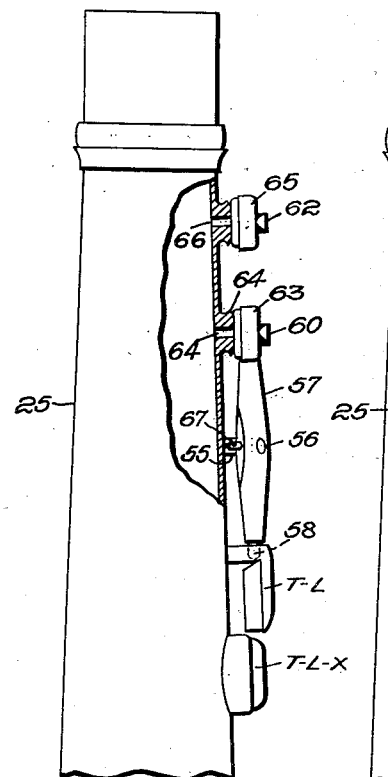
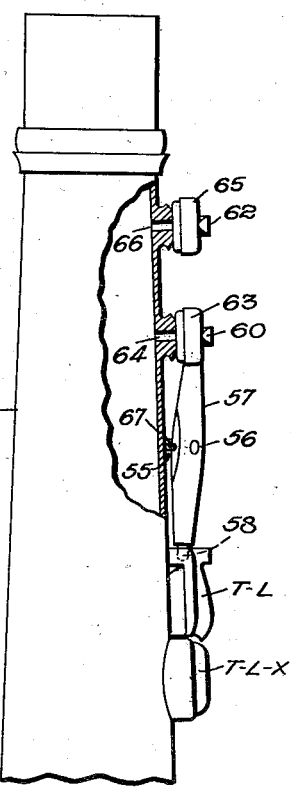
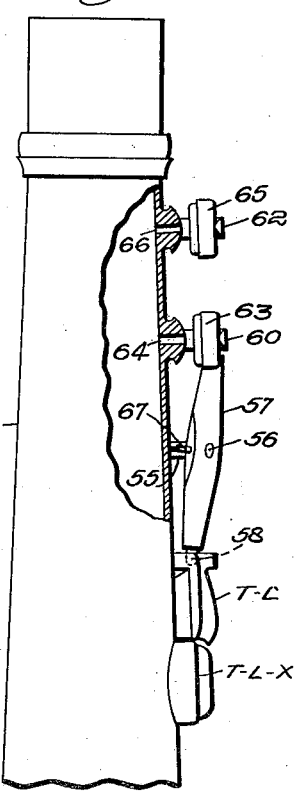
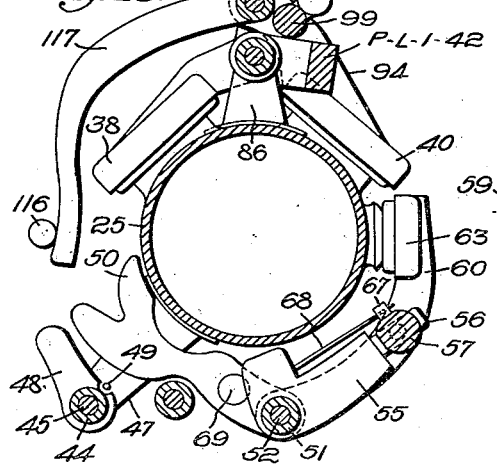
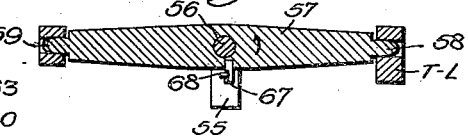
Inventor:
Edward V. Powell,
by Emery, Booth, Varney & Townsend.
Attys Aug. 18, 1936.  E. V. POWELL  2,051,176
WIND INSTRUMENT OF THE REED TYPE
Filed Sept. 29, 1934  7 Sheets-Sheet 5
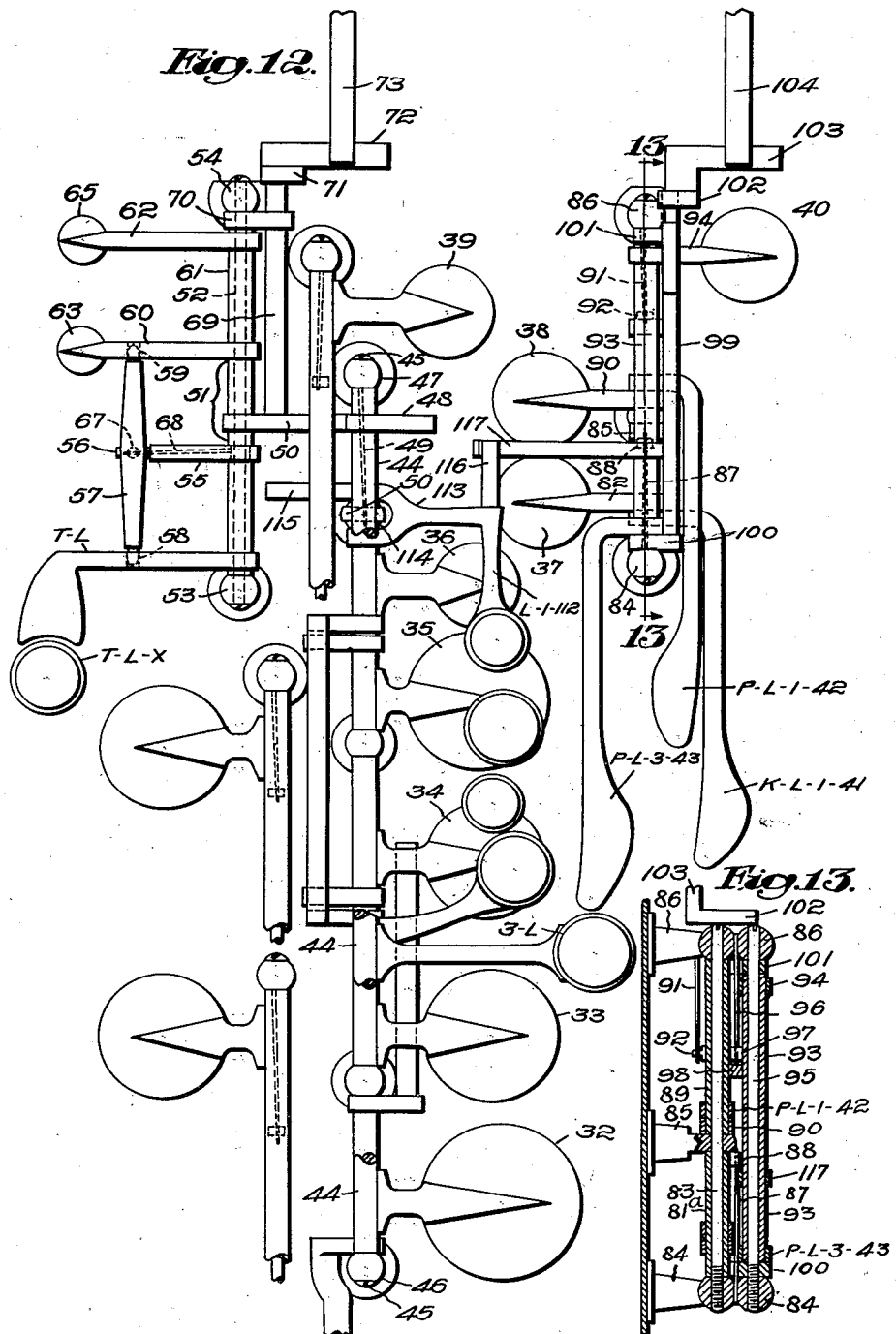
Inventor:
Edward V. Powell,
by Emery, Booth, Varney & Townsend, Att'ys Aug. 18, 1936.   E. V. POWELL   2,051,176
WIND INSTRUMENT OF THE REED TYPE
Filed Sept. 29, 1934   7 Sheets-Sheet 6
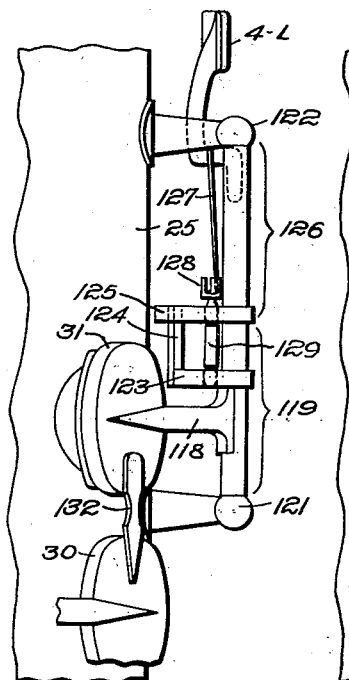
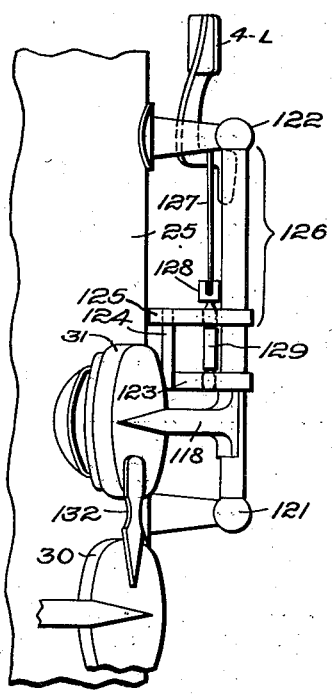
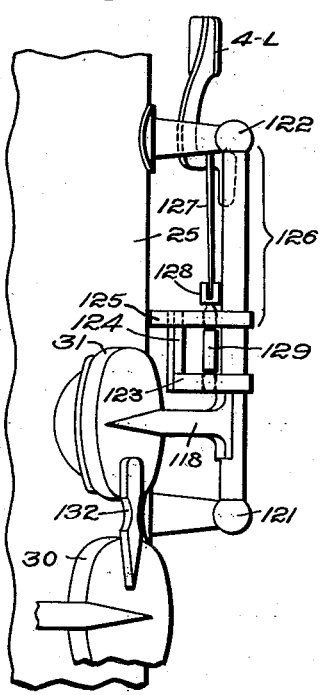
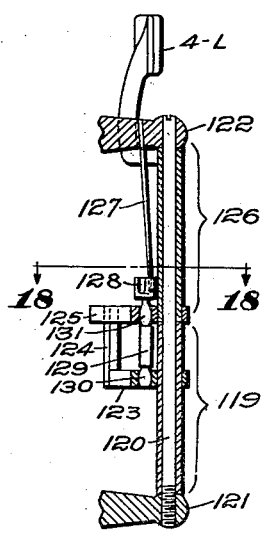
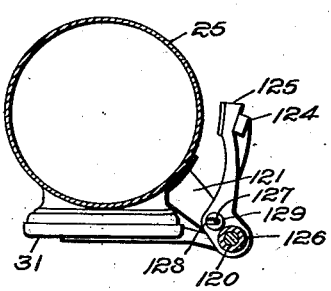
Inventor:
Edward V. Powell, Aug. 18, 1936.                E. V. POWELL                2,051,176
                   WIND INSTRUMENT OF THE REED TYPE
                      Filed Sept. 29, 1934        7 Sheets-Sheet 7
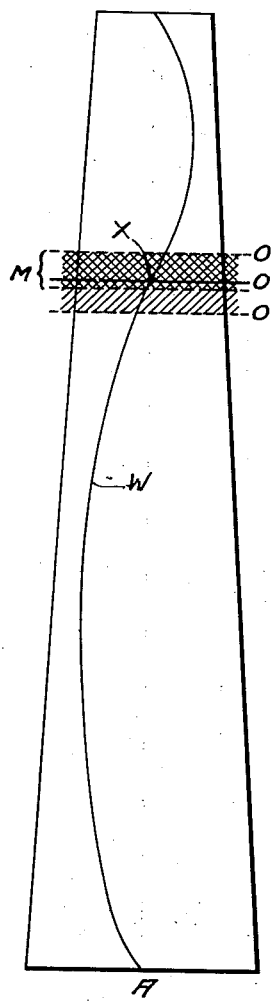
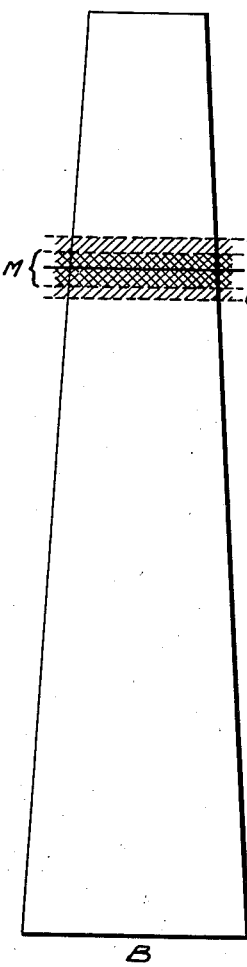
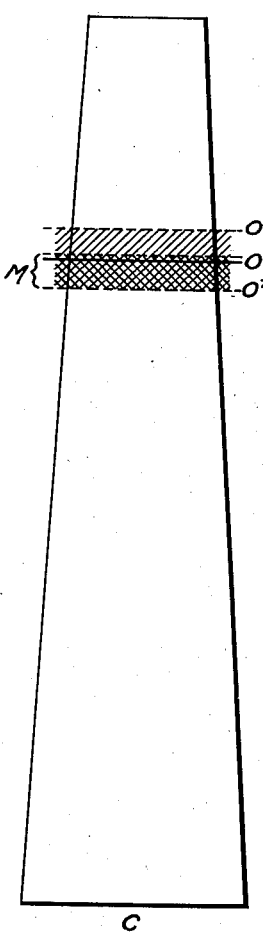
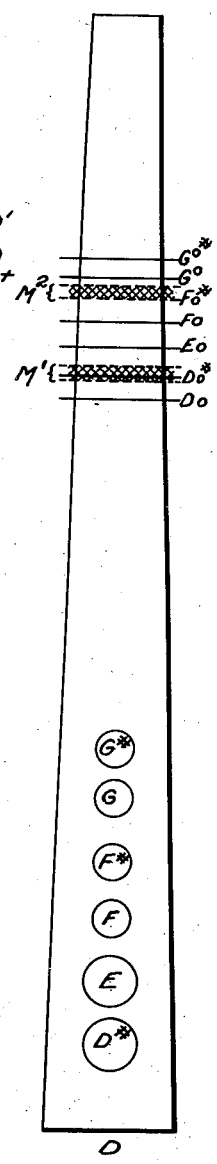
Inventor:
Edward V. Powell, Patented Aug. 18, 1936

2,051,176

UNITED STATES PATENT OFFICE 2,051,176

WIND INSTRUMENT OF THE REED TYPE

Edward V. Powell, Arlington, Mass.

Application September 29, 1934, Serial No. 746,110

18 Claims. (Cl. 84—385)

This invention relates to wind instruments of the reed type, such as the saxophone, the clarinet, the oboe and the bassoon, though it is more especially concerned with the saxophone. The invention aims to provide a system which will faithfully reproduce the notes of the lower register of the saxophone in their first harmonics, or octaves. Another aim is to improve and to simplify the G# key mechanism.

A brief explanation of the fundamental principles involved in the octave system will aid in obtaining a clear understanding of the invention. Let us first consider the vibrating air column in a cylindrical or parallel-sided tube such as an organ pipe. When air under pressure is admitted to the inlet end of the pipe, the point of maximum pressure or density of the air is midway between the ends. If we make a large hole (which is equivalent to cutting off the pipe) toward the outlet, the air column is shortened that much, the point of maximum pressure shifts toward the inlet to a point midway between the two ends, and the pitch of the note rises. As this condition changes, the point of maximum pressure retreats toward the inlet, and the pitch rises with the introduction of successive large holes (or cutting off the pipe) toward the inlet.

With a given length of pipe, it is possible to play the fundamental note with a moderate pressure, and without change in the pipe, but with greater pressure, to play the first harmonic, or octave of that note. However, under this condition, the first harmonic, or octave, is unstable and difficult to obtain and maintain. This condition can be removed and a stable, true tone obtained by introducing a small, octave hole at or near the point of maximum pressure, that is, midway or nearly midway of the pipe.

In saxophones as heretofore generally used, two such octave holes are provided—one for use with an air column of one length, and the other for use with a shorter air column (secured by opening large holes near the lower end of the instrument) but as the pipe or tube is tapered, the point of maximum pressure in each case is not midway in the air column but is nearer the upper, or inlet end.

However, even by the provision of two octave holes, a number of false tones, or imperfect octave-harmonics, are produced. All saxophones now on the market have two octave holes to cover the entire upper register. This imperfection of the present instruments is well understood, and various attempts have been made to provide a third octave hole but the mechanisms which have been provided for this purpose are cumbersome, complicated and extremely difficult to operate.

The upper register of the saxophone (sixteen notes in all) theoretically requires an octave hole for each note, because of the peculiar measurements of the saxophone. This, however, is obviously impracticable, and it is necessary to make a compromise. I have discovered that one octave hole, suitably placed, will efficiently accommodate four or five notes (half steps) but no more. Four octave holes will produce a smooth curve of quality of tones for the entire upper register. According to my invention, three or four octave holes are entirely practicable with the utmost simplicity of mechanism and convenience in operation.

The most important features of this mechanism are, (1) the positive opening and closing of two octave holes by one rigid member, (2) the operation of the fourth hole with the side (or knuckle) keys operating the high notes, and (3) the opening of the third octave hole in the upper register with the closing of the first-mentioned two holes. Other features and advantages will appear during the course of the following detailed description.

The invention will be best understood by reference to the following description when taken in connection with the accompanying drawings of one specific embodiment thereof, while its scope will be pointed out more particularly in the appended claims.

In the drawings:

Fig. 1 is an elevation of a saxophone embodying the invention;

Figs. 2 to 6 inclusive are elevations on an enlarged scale as viewed from the left of Fig. 1, illustrating different positions of the octave mechanism;

Figs. 7, 8 and 9 are views partly in elevation and partly in section, on a still larger scale, illustrating different positions of a portion of the octave mechanism;

Fig. 10 is a sectional view, on a still larger scale, on line 10—10 of Fig. 2, looking in the direction of the arrows on said line;

Fig. 11 is a sectional view on an enlarged scale on line 11—11 of Fig. 2, looking in the direction of the arrows on said line;

Fig. 12 is a somewhat diagrammatic development of a portion of a saxophone, illustrating a portion of the octave mechanism;

Fig. 13 is a sectional view on line 13—13 of Fig. 12;

Figs. 14, 15 and 16 are elevations illustrating in different positions the mechanism operated by the fourth finger of the left hand to raise a cover to play the note G♯;

Fig. 17 is a longitudinal, sectional view of the mechanism shown in Figs. 14, 15 and 16 in a plane containing the axis of the shaft;

Fig. 18 is a sectional view on line 18—18 of Fig. 17, looking in the direction of the arrows on said line; and Figs. 19, 20, 21 and 22 are diagrams illustrating the considerations involved in the locations of octave holes.

Figure 1:
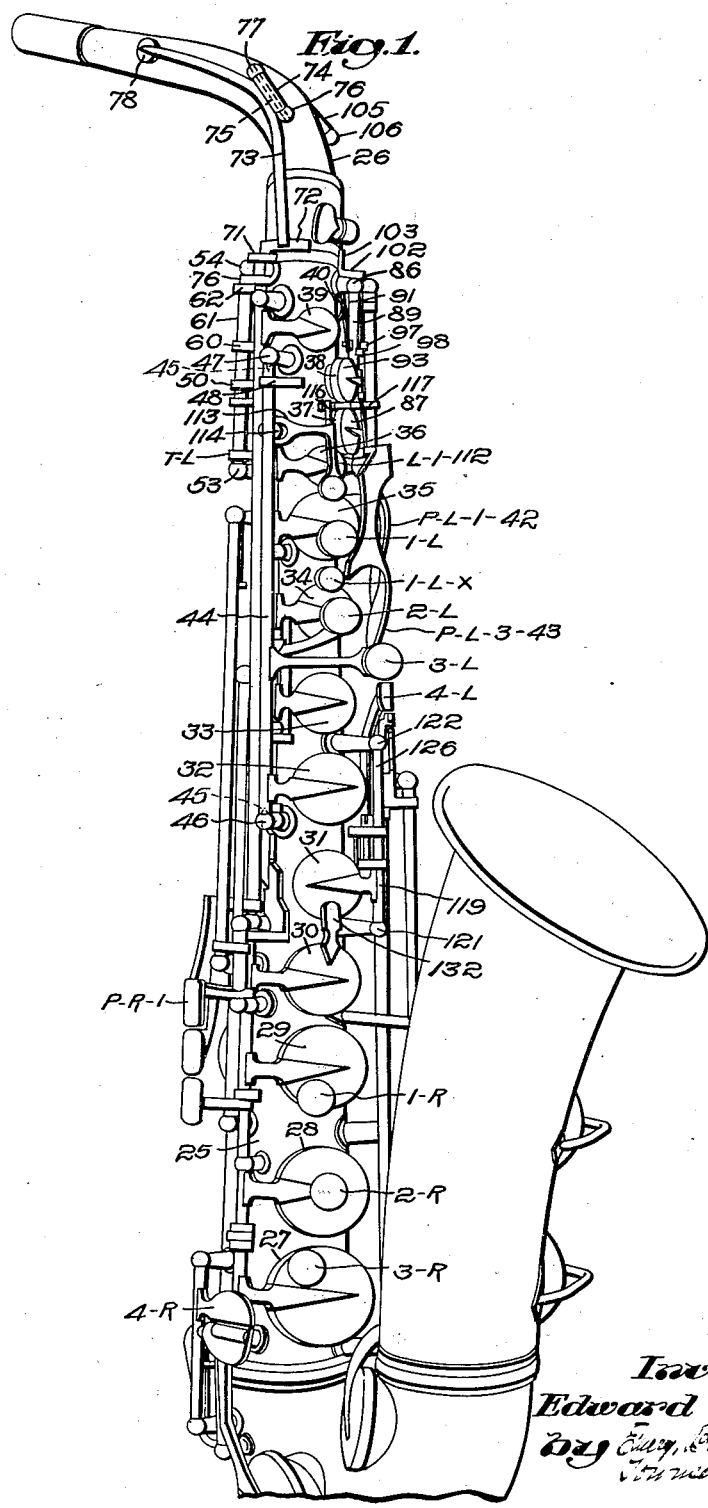
Figure 2:
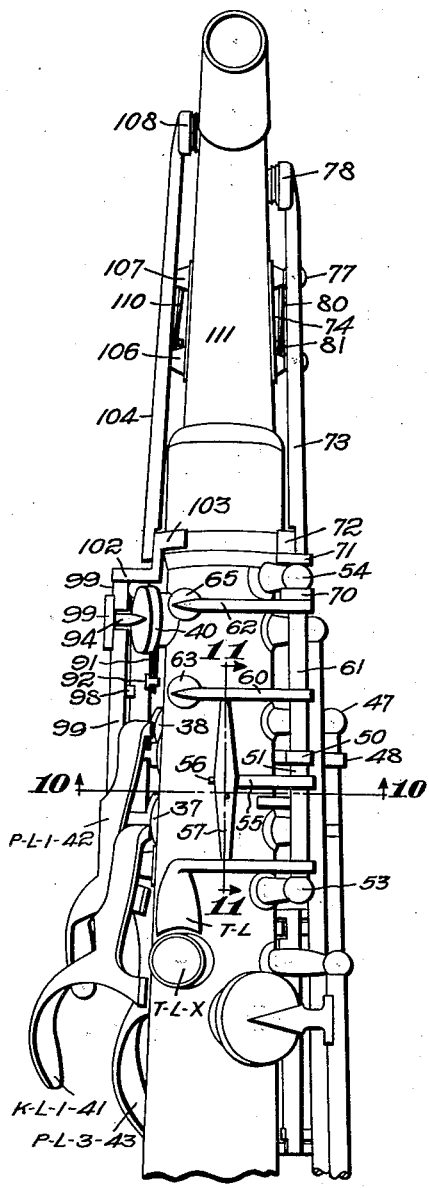
Figure 3:
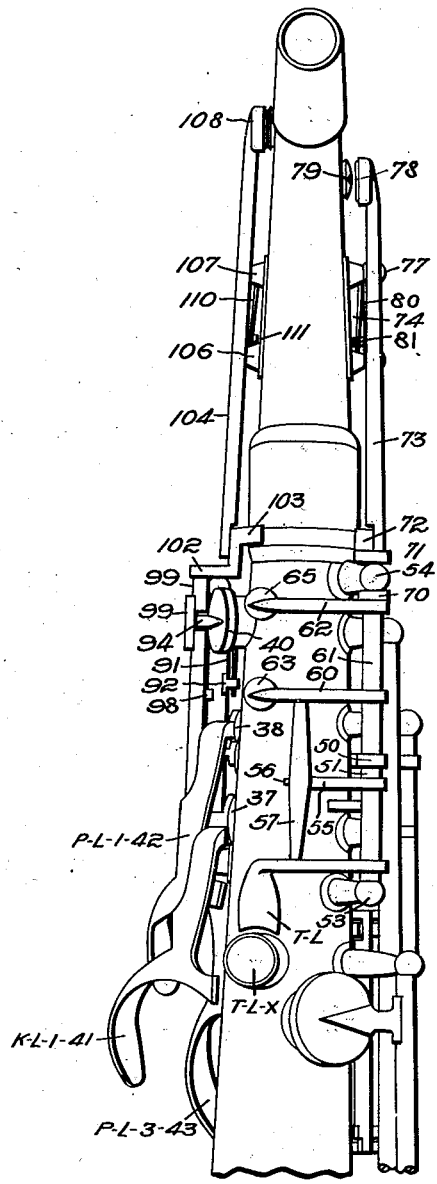

Referrings to the drawings, and to the embodiment of the invention which has been selected for illustration, there is shown a saxophone whose general construction and mode of operation are usual and well known, and only those parts which are necessary to an understanding of the present invention will be described in detail.

The saxophone has a pipe comprising a body 25 (see Fig. 1) to which is attached a neck 26, the usual mouth-piece provided with a reed being omitted. The usual tone hole covers and their operating mechanisms will be described only to the extent necessary or desirable to gain a proper understanding of the present invention. The instrument comprises tone hole covers, which, beginning at the lower portion of the instrument, are designated 27 to 40 inclusive, controlling corresponding tone holes which are not designated because they are hidden by their respective covers, but it is deemed unnecessary to show the holes because they are well known. The covers 27 to 30 inclusive and 32 to 36 inclusive are normally elevated by springs, as usual, and the covers 31, 37, 38, 39 and 40 are normally depressed by springs which it will be unnecessary to describe, with certain exceptions hereinafter noted, as their operation is well understood.

For the sake of simplicity, directness and brevity, let it be considered that the fingers and the keys which they operate be designated T—L, 1—L, 2—L, 3—L and 4—L, as referring to the thumb and the first, second, third and fourth fingers, respectively, of the left hand, and 1—R, 2—R, 3—R and 4—R as referring to the first, second, third and fourth fingers of the right hand. In the case of 1—L, the finger operates two keys alternatively, and one is designated 1—L and the other 1—L—X. In the case of T—L, the thumb is sometimes on a key T—L and sometimes on a fixed button designated T—L—X. Such of the so-called "knuckle keys" as it is necessary to refer to will be given other designations as hereinafter noted.

The knuckle of the first finger operates a key K—L—1—41, the middle phalange of the same finger operates a key P—L—1—42, and the basal phalange of the third finger operates a key P—L—3—43.

The octave mechanisms and the related parts will now be described, reference being had at first to Fig. 1. The cover 32 and the key or arm 3—L are rigidly mounted on a rock-shaft 44 which rocks on fixed pivots 45 secured to brackets 46 and 47. Also rigidly mounted on the rock-shaft 44 is an arm 48. A spring 49 (Fig. 12), having one end rigidly anchored in the bracket 47, has its other end engaged with an arm 50 rigidly mounted on the shaft 44. The spring 49 is so arranged that it constantly tends to turn the shaft 44 in the proper direction to lift the cover 32, the key 3—L and the arm 48 from the body 25.

The arm 48 (see Fig. 10) overlies and is normally spaced from an arm 50 which is rigidly mounted on a sleeve 51, the latter being loosely mounted on and about a fixed shaft 52 whose ends are mounted in brackets 53 and 54 (see Fig. 12). Also rigidly mounted on this sleeve is an arm 55 which carries a pivot 56 on which a balance lever 57 is mounted to rock. This lever carries two pivots 58 and 59, having loosely rocking connection, one with a thumb key T—L and the other with an arm 60, the latter being rigidly mounted on a sleeve 61 which is loosely mounted on and about the shaft 52, and on this sleeve is also rigidly mounted an arm 62. The arm 60 carries an octave hole cover 63 which controls an octave hole 64 (see Figs. 7, 8 and 9), and the arm 62 carries an octave hole cover 65 which controls an octave hole 66. The reason for providing these two, adjacent octave holes will be explained hereinafter. The arms 60 and 62 and their covers 63 and 65, being rigidly connected, move as one. These covers are normally seated upon their respective holes by a spring now to be described.

Returning now to Figs. 10 and 11, the balance lever 57 also rigidly carries a short arm 67 which is notched to receive the free end of a spring 68 whose other end is rigidly anchored in the arm 55. This spring has a peculiar and important triple action; it is so arranged that it constantly tends to rock the balance lever 57 on the pivot 56 in the direction of the adjacent arrow in Fig. 11; and thus, through the balancing action of the lever 57, the spring 68 tends to elevate the key T—L, and also to depress the arms 60 and 62 and to press the octave hole covers 63 and 65 onto their respective octave holes 64 and 66.

The spring 68 has also a third function which will be evident from an examination of Fig. 10 and a comparison with Fig. 11. When the covers 63 and 65 are seated, the spring 68 tends to press the arm 50 inwardly against the body 25 of the instrument, and as the arm cannot travel inwardly, the reaction of the spring is to elevate the key T—L. Thus, the described octave mechanism is so constructed that the two covers 63 and 65 are normally seated (see Fig. 7), and the key T—L is normally elevated.

Now then, unless the arm 50 (see Fig. 10) be restrained by the arm 48, as presently explained, inward pressure of the left thumb on the key T—L (see Fig. 8) will depress the pivot 58 inwardly toward the body of the instrument, and as the arm 60 cannot swing inwardly, the pivot 59 becomes the fulcrum of the lever 57, and the latter (see Fig. 10), as a consequence, swings the arm 55 inwardly and rocks the sleeve 51 about the shaft 52, thus swinging the arm 50 outwardly from the body 25. On the other hand, if the arm 50 (see Fig. 10) be restrained by the arm 48, as presently explained, the arm 55 which carries the pivot 56 is maintained in its elevated position shown in Fig. 9, and therefore, if pressure of the left thumb be applied to the key T—L, the pivot 56 becomes the fulcrum of the lever 57 and the octave hole covers are raised. Restraint of the arm 50 by the arm 48, as first mentioned, is caused by pressure of the third finger of the left hand upon the key 3—L.

When there is no pressure upon the key 3—L, pressure of the left thumb on the key T—L rocks the balance lever 57 on its upper pivot 59, and the arm 55 is swung inwardly, thus rocking the sleeve 51 and the arm 50; it also rocks a rod or yoke 69 (Fig. 12) rigidly attached to the arm 50 and to another arm 70 loosely mounted on and about the shaft 52. The rod 69 is prolonged beyond the arm 70 and the bracket 54 and rigidly carries a third arm 71 having an inwardly offset portion 72 which underlies the lower end of a lever 73 having a sleeve portion 74 (see Fig. 1) mounted to rock on a shaft 75 whose ends are supported by brackets 76 and 77 on the neck 26.

The upper end of the lever 73 carries an octave hole cover 78 normally seated upon an octave hole 79 (shown in Figs. 4, 5 and 6) by a spring 80 one end of which is fixedly anchored in the bracket 77, while the other end engages an arm 81 fixedly carried by the lever 73. The action of the lever, because of its form and the direction of its fulcrum, will best be understood by an examination of Fig. 1 from which it is evident that when the lower end of the lever is lifted by the underlying offset 72 of the arm 71, as hereinbefore explained, the upper end of the lever also rises and lifts the cover 78 in opposition to the spring 80.

Returning to the balance lever 57 (Fig. 12), the latter has another function which will now be described. If pressure of the left thumb be exerted on the key T—L, the arm 50 is thereby elevated. When, therefore, pressure of the third finger of the left hand is exerted on the key 3—L, thus rocking the shaft 44, the arm 48, rigidly carried by said shaft, engages the arm 50 and swings the latter inwardly thus rocking the sleeve 51 and swinging the arm 55 and the pivot 56 outwardly.

The lower pivot 58 of the balance lever 57 now becomes the fulcrum of the latter, and the upper pivot 59 of said lever rises, and through its connection with the arm 60, lifts the keys 63 and 65 because said keys are rigidly connected to each other by the sleeve 61. Also, when this takes place, inasmuch as the arm 50 is rigidly connected by the yoke 69 to the arm 71, the underlying portion 72 of the latter disengages the lever 73 and allows the octave hole cover 78 to close upon 79.

The fourth octave hole cover and its operating mechanism will now be described, reference being had at first to Fig. 12. It will be remembered that brief mention has been made of three "knuckle" keys which operate the tone hole covers 37, 38 and 40. The key K—L—1—41 operates the cover 37 by being fixedly secured to a sleeve 81—a (see Fig. 13) to which there is also fixedly secured an arm 82 (now see Fig. 12) which carries the cover 37. The sleeve 81—a is loosely mounted on and about a shaft 83 (see Fig. 13) which is fixedly mounted in brackets 84, 85 and 86. A spring 87, fixedly secured at one end to the bracket 84, and having its other end received in a lug 88 on the sleeve 81—a, constantly tends to seat the cover 37 (see Fig. 12). Pressure of the knuckle of the first finger of the left hand on the key K—L—1—41 lifts the cover 37 in opposition to the spring 87.

The key P—L—1—42 operates the cover 38 by being fixedly secured to a second sleeve 89 (see Fig. 13) to which there is also fixedly secured an arm 90 (now see Fig. 12) which carries the cover 38. The sleeve 89 is loosely mounted on and about the same shaft 83 on which the sleeve 81 is mounted. A spring 91, fixedly secured at one end to the bracket 86 and having its other end resting against a lug 92 on the sleeve 89, constantly tends to seat the cover 38. Pressure of a phalange of the first finger of the left hand on the key P—L—1—42 lifts the cover 38 in opposition to the spring 91.

The key P—L—3—43 operates the cover 40 by being fixedly secured to a sleeve 93, to which is fixedly secured an arm 94 (see Fig. 12) which carries the cover 40. The sleeve 93 is loosely mounted on a shaft 95 supported in the brackets 84 and 86. A spring 96 (Fig. 13), fixedly secured at one end to the bracket 86 and having its other end resting against a lug 97 fixedly mounted on the sleeve 93 constantly tends to lower the cover 40. Pressure of a phalange of the third finger of the left hand on the key P—L—3—43 lifts the cover 40 in opposition to the spring 96.

When the key P—L—1—42 is depressed, as hereinbefore described, to lift the cover 38, a lug or cam 98 (Fig. 13), fixedly mounted on the sleeve 89, engages a rod or yoke 99 (Fig. 12) whose ends are fixedly mounted on arms 100 and 101 which are loosely mounted on the shaft 95 adjacent to the brackets 84 and 86, respectively. Also fixedly mounted on the upper end of the rod or yoke 99 is an arm 102 (see Fig. 12) having an inwardly offset portion 103 which underlies the lower end of a lever 104 having a sleeve portion 105 (see Fig. 4) mounted to rock on and about a shaft (not shown) whose ends are fixedly supported by brackets 106 and 107 on the neck 26. The upper end of the lever 104 carries an octave hole cover 108 normally seated upon an octave hole 109 by a spring 110, one end of which is fixedly secured in the bracket 107, while the other end engages an arm 111 fixedly carried by the lever 104. When the lower end of the lever is lifted by the underlying offset 103 of the arm 102, as hereinbefore explained, the upper end of the lever also rises and lifts the cover 108 in opposition to the spring 110.

Pressure on any one of the "knuckle" keys K—L—1—41 or P—L—1—42, or P—L—3—43, lifts not only the tone hole cover controlled by such key (i. e., the covers 37, 38 and 40), but also lifts the octave hole cover 108. For example, when the key K—L—1—41 is depressed to raise the tone hole cover 37, the spring lug 88 (see Fig. 13) acts as an arm or cam against the rod or yoke 99 (Fig. 12) to rock the latter and therefore to cause the octave hole cover 108 to be lifted. When the key P—L—1—42 is depressed to lift the tone hole cover 38, the arm or cam 98, as already explained, engages and rocks the rod or yoke 99, and thus causes the octave hole cover 108 to be lifted. When the key P—L—3—43 is depressed to raise the tone hole cover 40, the arm 94 which carries said cover and which underlies the rod or yoke 99, rocks the latter and thus, through the arm 102 carried by said yoke, rocks the lever 104 and lifts the octave hole cover 108. Thus, the octave hole cover is lifted conjointly with the lifting of each of the tone hole covers 37, 38 and 40.

There is still another novel way of lifting the octave hole cover 108, which may be availed of, if desired. Overlying the tone hole covers 35 and 36 is a key L—1—112 carried by a yoke-like arm 113 which embraces and is pivotally supported by a bracket 114 and is limited in its outward movement by an arm 115 normally engaging the body 25 of the instrument. The arm 113 has an extension 116 extending lengthwise of the instrument and overlying an arm 117 rigidly carried by the sleeve 93. When, therefore, the key L—1—112 is depressed by the first finger of the left hand, the normally elevated tone hole covers 35 and 36 are depressed, and the tone hole cover 40 is elevated; and the octave hole cover 108 also is elevated.

The key L—1—112 is an auxiliary lever and is used in playing certain higher-harmonic or third register notes not normally considered to be within the range of the saxophone. The fact that pressure on this key causes the octave hole cover 108 to be lifted is an advantage; the reason apparently being that the octave hole 109, being nearer the generating source of vibrations, favors notes of higher frequencies.

The key L—1—112 is called the "high F key", and for the purposes of this invention, an explanation of its use in playing that one note is believed to be sufficient. The fingering for playing this note is L—1—112, 2—L, T—L. This will produce the note F above the staff.

The construction and mode of operation of the tone hole cover mechanisms are old and well known, except as modified by the described octave mechanisms, and except for the novel tone mechanism presently to be described, and it therefore is deemed unnecessary to show or to describe the tone hole mechanisms in detail. The exception, just noted, has to do with the G♯ key whose prime function is to control the interval G—G♯. This mechanism is simplified, as compared with the prior art, by the employment of a three-function spring, and, in this respect, it broadly resembles the described octave mechanism in which simplification is achieved by the three-function spring 68.

This new G♯ mechanism will now be described, reference being had to Figs. 14 to 18 inclusive. The tone hole cover 31 is carried by an arm 118 which is rigidly carried by a sleeve 119 loosely mounted on and about a fixed shaft 120 whose ends are mounted in brackets 121 and 122. Also fixedly mounted on the sleeve 119 is an arm 123 having a lug 124 overlying the outer side (underneath, as viewed in Figs. 14, 15, 16 and 17) of an arm 125 which is rigidly mounted on a second sleeve 126 loosely mounted on and about the shaft 120, and on this sleeve the key 4—L is rigidly mounted.

A spring 127 is rigidly secured at one end to the bracket 122 and its free end is received in a recess 128 in one end of a lever 129 which presents two rounded pivots 130 and 131 having pivotal connection with the arms 123 and 125, respectively, as by being received in holes therein.

Normally, the key 4—L is maintained in an elevated position and the tone hole cover 31 is maintained depressed (see Fig. 14) by the spring 127 whose thrust is in a direction perpendicular to the plane of the paper in Figs. 14, 15, 16 and 17 and from the observer. The key 4—L is elevated because the thrust of the spring tends to move the lever 129 bodily from the observer and thus to swing the arm 125 from the observer and to rock the sleeve 126 clockwise as viewed in Fig. 18. The tone hole cover 31 is depressed because the arm 125 is urging the overlying lug 124 outwardly and the latter is rigidly connected by the arm 123, sleeve 119 and arm 118 to the cover 31.

When the key 4—L is pressed toward the horn body, in opposition to the spring 127, the arm 125 moves in an inward direction until it strikes the horn body. But the thrust of the spring maintains the arm 125 against the lug 124 of the arm 123 and therefore the latter rocks the sleeve 119, and through the arm 118, lifts the cover 31. This is the condition shown in Fig. 15, and exists when the tone hole cover 30 is in its elevated position.

Now, with the key 4—L depressed and with the arm 125 held fixed, the pivot 131 of the lever 129 becomes its fulcrum, and if any one or all of the keys 1—R, 2—R, 3—R are depressed, an arm 132, rigidly carried by the tone hole cover 30 and overlying the tone hole cover 31, depresses the latter, in opposition to the resistance of the spring 127. This is because of the fact that the rocking of the arm 118, sleeve 119 and arm 123 causes the latter, connected to the pivot 130, to swing the lower end of the lever 129 inwardly, said lever rocking about the pivot 131 as a fulcrum, and the upper end of said lever swinging toward the observer, in opposition to the spring 127. During this movement, the lug 124 of the arm 123 swings away from the underlying arm 125. This condition is shown in Fig. 16.

This same condition is sometimes obtained by first closing and maintaining the cover 31 closed by the arm 132, with 1—R, 2—R and 3—R, and then depressing the key 4—L. In this case, the lever 129 rocks on the pivot 130 as a fulcrum as the arm 125 moves away from the lug 124 of the arm 123 and toward the horn body.

The whole of the mechanism just described is a unit with a single spring to provide a new means for the opening and closing of the tone hole cover 31 by pressure on the key 4—L, or by depressing the keys 1—R, 2—R, 3—R.

It will be remembered that in saxophones, as heretofore generally used, there are but two octave holes to cover the entire upper register and that their limitations are such that a number of false tones, or imperfect octave-harmonics, are produced; that the sixteen notes in the upper register, in theory, require an octave hole for each note; and that four octave holes will produce a smooth curve of quality of tones for the upper register.

This important and very desirable and useful result is achieved by the use of the four octave holes, their covers, and the described mechanism by which they are operated. The locations of these octave holes, with relation to the musical scale, will now be explained.

Let us first consider a musical horn A, as shown in Fig. 19, with an air column vibrating in the first or octave-harmonic. The condition of pressure is represented by a sinusoidal wave W showing a point of zero pressure at $x$. If a small hole be made in the plane $o$, passing through $x$, the desired effect would be to sustain the octave frequency against its natural fundamental. For practical purposes, it is found that this hole may be made within a region between the planes $o$ and $o^+$.

Now, let us consider several graded lengths of horn A, B, and C, shown in Figs. 19, 20 and 21, respectively, with the same conditions of an "octave region" slightly displaced with the shortening of the horn length. There is a region M at the same distance from the small ends of all the horns, which region is common to $o$ and $o^+$ of all the horns.

If, now, we combine these several horns into one horn having the length of A provided with large holes toward the large end for the purpose of changing the effective length of the horn, and if we make a small hole in the region of M, this single hole will satisfy the octave requirements of several different frequencies provided by the different lengths of horn.

With respect to the saxophone in question, let us consider the right hand section (i. e. the section played by the right hand) which, in effect, controls seven different lengths of horn. Fig. 22 shows these lengths of pipe by their respective tone holes D, D♯ and so on. Their respective zero pressure points are shown by D$o$, D$o$♯, ... G$o$♯.

For this greater range of horn lengths, there is no region M common to all, and therefore one octave hole will not satisfy the octave requirements of all frequencies. We therefore conveniently divide the problem into two parts. First, let us consider Do—Eo, inclusive. We locate a region M', where a small hole will give good octaves for D—E, inclusive. Second, for Fo—Go#, we locate a region $M^2$ which will give good octaves for F—G#, inclusive.

In the actual instrument shown and described, these two octave holes are designated 64 and 66. The effect of these two holes being open at the same time is that when one is acting as an octave hole, the other is a small leak, and vice versa, when the second is an octave hole, the first is a leak. This leak is shown by test to be negligible and so, for the sake of simplicity, I have the two holes open and close together, for it will be remembered that the two octave hole covers 63 and 65 are rigidly connected to move as one.

I will now explain the considerations governing the locations of the octave holes 79 and 109 in the neck of the instrument.

The hole 79 operates for five horn lengths (five half tones), controlled by the left hand as follows: (I—L, I—L—X, T—L, 2—L); (I—L, T—L, I—L—X); (I—L, T—L); (2—L, T—L); (T—L). For these five notes, the hole 79 is tapped at the region of M for these horn lengths.

The hole 109 operates four horn lengths (four half tones), controlled by the left and right hands as follows: (T—L, K—L—I—41); T—L, K—L—I—41, P—L—I—42); (T—L, K—L—I—41, P—L—I—42, P—R—I); (T—L, K—L—I—41, P—L—I—42, P—R—I, P—L—3—43). For these four notes, the hole 109 is tapped at the region M for these horn lengths.

My system supplants existing systems as follows: the holes 64 and 66 replace a single hole which was outside the region M for certain "border tones"; the hole 79 has been moved down the horn to its proper position for the above-described notes; and the hole 109 is an added or new hole:—in other words, the holes 79 and 109 replace a single hole which was outside the region M for other "border tones". In short, four holes replace two: two for one in the body; and two for one in the neck. And the mechanism for accomplishing this is controlled by the left hand; an important consideration.

From the foregoing description it will be gathered that the improvements in the instrument are of two kinds: tonal and mechanical. The tonal improvement is secured by the presence and position of the four octave holes. The mechanical advantages are, in part, the result of the means for opening and closing these four holes. And it is important to note that these means are all mechanically operated by the left hand. All other systems in general use are two-hole systems which produce a number of false notes, or imperfect octave-harmonics in the upper register.

As already stated, attempts have been made to overcome these false notes by the use of triple-hole key systems which, however, require the use of both hands, and which, moreover, are complicated and impractical. I believe that, in arriving at the four-hole principle, I have produced a broadly novel invention which is far superior to all prior octave systems.

The mechanism will readily be understood by considering it in two parts. The first part has to do with the holes 64, 66 and 79 and their covers. The covers for the holes 64 and 66 are rigidly connected to open and close together and thus can be considered as a single key. With the left thumb on the key T—L and with the third finger of the left hand on key 3—L, three combinations of key positions are possible, namely: (1) No levers depressed (normal); (2) T—L and 3—L depressed; (3) T—L alone depressed. It should be noted that the single spring 68, causing a thrust on the balance lever 57, accomplishes the three actions of the latter.

The second part of the mechanism is this: the three keys K—L—I—41, P—L—I—42, and P—L—3—43, in addition to their normal function of opening their own tone-holes, also have contact with a common connection 103 to lift the tone hole cover 108 from its opening.

The mode of playing the instrument, insofar as the present invention is concerned, should be understood by those skilled in the art, but will now be covered briefly, by a description of the finger movements and the resulting mechanical actions in playing the chromatic scale, beginning with D in the staff through F above the staff, which represents the range of the upper register of the saxophone.

The notes D to C#, inclusive, of the upper register are the same fingering as the corresponding notes of the lower register with the only difference that for those notes of the upper register the left thumb engages the octave key T—L. The rest of the operation is automatic with the other fingers.

Proceeding up the scale, we come to the interval C of the lower register to D of the upper register. The position for C is simply the middle finger (2—L) of the left hand; the position for D of the upper register is the fingers I, 2, and 3 of the left and right hands and the thumb of the left hand.

Referring to the drawings (Fig. 12), this is what happens: the third finger of the left hand depresses the lever 3—L, which operates through the shaft 44 and arm 48 to hold the arm 50 depressed. The arm 50, having rigid connection with the arm 55, holds the latter fixed, so that the pressure of the thumb of the left hand on the key T—L causes the lever 57 to rock on the pivot 56, thus raising the octave hole covers 63 and 65 from their openings.

This condition continues while the fingers 3, 2, and I of the right hand are lifted consecutively to play the notes E, F, and G of the upper register. From G to A of the upper register (lifting the third finger of the left hand) great changes occur. The raising of the third finger of the left hand releases the key 3—L and allows the arm 48 to rise. The spring 68 (Fig. 10) allows the lever 57 to rock on the pivot 56, thereby to depress the arm 55 and the arms 60 and 62, thus lowering the octave hole covers 63 and 65 onto their openings, and also allowing the arm 50 to rock and to follow the arm 48 in its movement from the body of the instrument. At the same time, the yoke 69 swings the arm 72, thus rocking the lever 73 to raise the octave hole cover 78 from its opening. This condition prevails for the notes A, B, and C# of the upper register.

For the note D, the knuckle of the first finger of the left hand engages and depresses the key K—L—I—41, which, in addition to opening its own hole, causes the arm 103 to rock the lever 104, thereby to raise the octave hole cover 108 from its opening. This condition prevails for the remainder of the register. This applies also to the keys P—L—I—42 and P—L—3—43, and insures the lifting of the octave hole cover 108 for the notes E, F.

Having thus described one embodiment of the invention, but without limiting myself thereto, what I claim, and desire by Letters Patent, to secure is:

1. In a wind instrument of the reed type, such as a saxophone, the combination of a pipe provided with the usual tone holes and at least three octave holes, two of which are adjacent each other, movable covers and operating mechanism for said tone holes, said operating mechanism including left hand knuckle keys for operating the covers of certain of said tone holes, movable covers for said octave holes, a rigid connection between the two covers of said two adjacent octave holes, and mechanism controlled by said knuckle keys for controlling the cover of a remaining octave hole.

2. In a wind instrument of the reed type, such as a saxophone, the combination of a pipe provided with the usual tone holes and at least three octave holes, two of which are adjacent each other, at least one of which octave holes is for the notes D to F inclusive above the staff, movable covers and operating mechanism for said tone holes, and movable covers and operating mechanism for said octave holes, the last-mentioned mechanism including a rigid connection between the covers of said two adjacent octave holes.

3. In a wind instrument of the reed type, such as a saxophone, the combination of a pipe provided with the usual tone holes including high D, D♯, E and F, and at least three octave holes, two of which are adjacent each other, movable covers and operating mechanism for said tone holes, including keys for high D, D♯, E and F, covers for said octave holes, a rigid connection between the two covers of said two adjacent octave holes, and means controlled by any one or all of said keys for controlling the cover of a remaining octave hole.

4. In a wind instrument of the reed type, such as a saxophone the combination of a pipe provided with the usual tone holes including high D, D♯, E and F, and at least three octave holes, two of which are adjacent each other, movable covers and operating mechanism for said tone holes, including keys for high D, D♯, E and F, covers for said octave holes, a rigid connection between the two covers of said two adjacent octave holes, and means controlled by said D key for controlling the cover of a remaining octave hole.

5. In a wind instrument of the reed type, such as a saxophone, the combination of a pipe provided with the usual tone holes including high D, D♯, E and F, and at least three octave holes two of which are adjacent each other, movable covers and operating mechanism for said tone holes, including keys for high D, D♯, E and F, covers for said octave holes, a rigid connection between the two covers of said two adjacent octave holes, and means controlled by said D♯ key for controlling the cover of a remaining octave hole.

6. In a wind instrument of the reed type, such as a saxophone, the combination of a pipe provided with the usual tone holes including high D, D♯, E and F, and at least three octave holes, two of which are adjacent each other, movable covers and operating mechanism for said tone holes, including keys for high D, D♯, E and F, covers for said octave holes, a rigid connection between the two covers of said two adjacent octave holes, and means controlled by a part of said operating mechanism for controlling the cover of a remaining octave hole.

7. In a wind instrument of the reed type, such as a saxophone, the combination of a pipe provided with the usual tone holes including high D, D♯, E and F, and at least three octave holes, two of which are adjacent each other, movable covers and operating mechanism for said tone holes, including keys for high D, D♯, E and F, covers for said octave holes, a rigid connection between the two covers of said two adjacent octave holes, and means controlled by said F key for controlling the cover of a remaining octave hole.

8. In a wind instrument of the reed type, such as a saxophone, the combination of a pipe provided with the usual tone holes and more than two octave holes, two of which are adjacent each other, movable covers and operating mechanism for said tone holes, movable covers for said octave holes, and operating mechanism for said octave hole covers, the last-mentioned operating mechanism including keys operated by the left hand, and a rigid connection between said two adjacent octave holes.

9. In a wind instrument of the reed type, such as a saxophone, the combination of a pipe provided with the usual tone holes and more than three octave holes, movable covers and operating mechanism for said tone holes, movable covers for said octave holes, and operating mechanism for said octave hole covers, the last-mentioned operating mechanism including keys operated by the left hand.

10. In a wind instrument of the reed type, such as a saxophone, the combination of a pipe provided with the usual tone holes and more than two octave holes, two of which are adjacent each other, movable covers and operating mechanism for said tone holes, movable covers for said octave holes, and mechanism for controlling the operation of said octave hole covers and including a positive connection causing the covers of said two adjacent octave holes to be open at once.

11. In a wind instrument of the reed type, such as a saxophone, the combination of a pipe provided with the usual tone holes and more than two octave holes, two of which are adjacent each other, movable covers and operating mechanism for said tone holes, movable covers for said octave holes, and mechanism for controlling the operation of said octave hole covers and including a positive connection between the two covers of said two adjacent octave holes, causing such two covers to be open at once.

12. In a wind instrument of the reed type, such as a saxophone, the combination of a pipe provided with the usual tone holes and more than two octave holes, two of which are adjacent each other and two of which control the notes D to G♯ inclusive of the upper register, movable covers for said octave holes, and mechanism for controlling said octave hole covers, said mechanism including a positive connection between the two covers of said two adjacent octave holes.

13. In a wind instrument of the reed type, such as a saxophone, the combination of a pipe provided with the usual tone holes and at least three octave holes, two of which are adjacent each other and at least one of which controls the notes D to G♯ inclusive in the upper register, movable covers for said octave holes, and operating mechanism for said octave hole covers operated by the left hand, said mechanism including a positive connection between the two covers of said two adjacent octave holes.

14. In a wind instrument of the reed type, such as a saxophone, the combination of a pipe provided with the usual tone holes and four octave holes, one of which controls the notes D to G# inclusive in the upper register, movable covers for said octave holes, and operating mechanism for said octave hole covers.

15. In a wind instrument of the reed type, such as a saxophone, the combination of a pipe provided with the usual tone holes and more than two octave holes, two of which are adjacent each other and one of which controls the notes A to C# inclusive in the upper register, movable covers for said octave holes, and operating mechanism for said octave hole covers, said mechanism including a positive connection between the two covers of said two adjacent octave holes.

16. In a wind instrument of the reed type, such as a saxophone, the combination of a tube provided with the usual tone holes and at least three octave holes, two of which are adjacent each other, movable covers and operating mechanism for said tone holes, and movable covers and operating mechanism for said octave holes, the last-mentioned mechanism including a positive connection between the two covers of said two adjacent octave holes, connected levers operated by two fingers, and a single spring connected to said levers and which effects three separate actions.

17. In a wind instrument of the reed type, such as a saxophone, the combination of a tube provided with two adjacent octave holes, covers for said holes, and operating mechanism including a thumb-operated key, a balance lever, and a three function spring which is connected to said lever and normally maintains said covers depressed and said key elevated and which elevates said covers when said key is depressed.

18. In a wind instrument of the reed type, such as a saxophone, the combination of a tube provided with two adjacent octave holes, covers for said holes, and operating mechanism including a thumb-operated key, a floating lever, a spring connected to said lever, and mechanism connecting said lever, on the one hand to said key and on the other hand to said covers, to enable said spring normally to maintain said covers depressed and said key elevated, and to elevate said covers when said key is depressed.

EDWARD V. POWELL.